UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF BARIUM ALUMINATE.

1,240,572.  Specification of Letters Patent.  Patented Sept. 18, 1917.

No Drawing.  Application filed October 21, 1916.  Serial No. 126,999.

*To all whom it may concern:*

Be it known that I, PAUL R. HERSHMAN, a subject of the Empire of Austria-Hungary, residing at Chicago, county of Cook, State of Illinois, have invented certain new and useful Improvements in the Production of Barium Aluminate; and I do hereby declare the following to be a full, clear, and exact description of the invention, such as will enable others skilled in the art to which it appertains to make and use the same.

The present invention relates to the manufacture of barium aluminate from impure aluminum oxid and barytes.

In the practice of the invention barytes is mixed with alumina in the proportion of their molecular weights and an amount of calcium oxid is added in proportion slightly in excess of its molecular weight. The mixture is then heated in an externally heated muffle to about 1000° C. and is maintained at this temperature for about three hours, the reaction being assisted by conducting steam through the muffle over and through the heated mass.

At the end of the operation, the barium aluminate formed is extracted with hot water. It is found that when the process is carefully conducted, under the best conditions, the greater part of the aluminum oxid and the greater part of the barium oxid contained in the sulfate are converted into aluminate and rendered soluble. If barium sulfate and aluminum oxid are heated, without the addition of calcium oxid, under the same condition, it is found that only about one-fourth to one-third of the quantity present is converted into barium aluminate as compared with the barium aluminate obtained with the aid of calcium oxid.

In some instances, the steam may be omitted, but with a lowering in the output under otherwise similar conditions of practice. So also, it will be understood that other barium compounds than barytes, if capable of reduction in the presence of calcium oxid, may be employed with aluminum oxid for the production of barium aluminate.

Having thus described my invention, what I claim is:

1. The method of producing barium aluminate, which comprises heating a barium compound capable of reduction in the presence of calcium oxid and aluminum oxid, in the presence of calcium oxid, to a reacting temperature resulting in the formation of barium aluminate; substantially as described.

2. The method of producing barium aluminate, which comprises heating a barium compound capable of reduction in the presence of calcium oxid and aluminum oxid, in the presence of calcium oxid, to a reacting temperature resulting in the formation of barium aluminate, the reaction being further assisted by the presence of steam; substantially as described.

3. The method of producing barium aluminate, which comprises heating barium sulfate and aluminum oxid, in the presence of calcium oxid to a reacting temperature resulting in the formation of barium aluminate; substantially as described.

4. The method of producing barium aluminate, which comprises heating barium sulfate and aluminum oxid, in the presence of calcium oxid to a reacting temperature resulting in the formation of barium aluminate, the reaction being assisted by steam; substantially as described.

In testimony whereof I affix my signature.

PAUL RALPH HERSHMAN.